(No Model.)
C. K. WELCH.
APPARATUS FOR MANUFACTURING PNEUMATIC TIRES.
No. 497,464. Patented May 16, 1893.
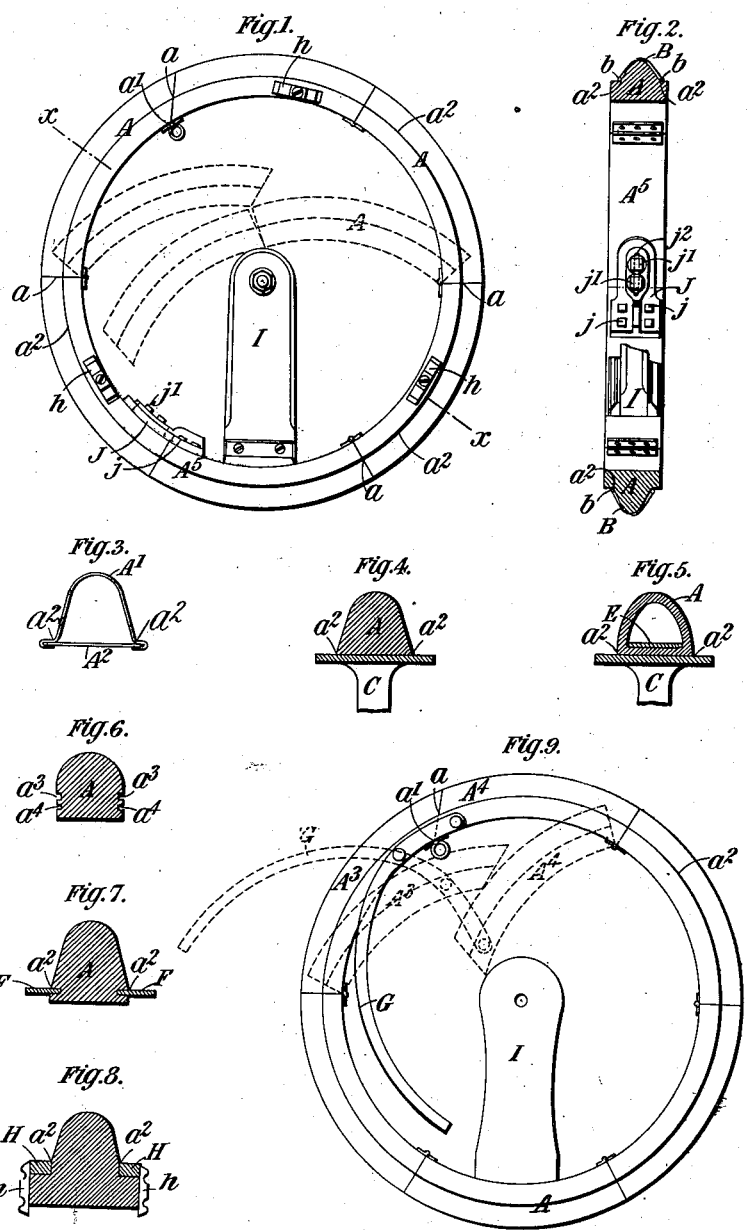
Witnesses:
Inventor
Charles K. Welch
by Duncan & Page
Attorneys

UNITED STATES PATENT OFFICE.

CHARLES KINGSTON WELCH, OF COVENTRY, ENGLAND, ASSIGNOR TO THE PNEUMATIC TYRE AND BOOTH'S CYCLE AGENCY, LIMITED, OF DUBLIN, IRELAND.

APPARATUS FOR MANUFACTURING PNEUMATIC TIRES.

SPECIFICATION forming part of Letters Patent No. 497,464, dated May 16, 1893.

Application filed January 7, 1893. Serial No. 457,619. (No model.)

*To all whom it may concern:*

Be it known that I, CHARLES KINGSTON WELCH, engineer, a subject of the Queen of Great Britain, and a resident of Coventry, England, have invented a certain new and useful Improved Tool or Apparatus for use in Manufacturing India-Rubber Tires, of which the following is a specification.

The present invention is a new and improved tool or appliance for use in the manufacture of pneumatic or similar tires. The covers or jackets for such tires are frequently made up on a circular rim technically known as a mandrel or "former," which in cross-section is semicircular or arched to conform to the shape of the finished tire. In certain forms of tire, as for example those shown and described in United States patent to Brown and Stillman, No. 488,494, dated December 20, 1892, wires or bands of non-elastic or inextensible material are incorporated with or attached to the edges of the covers or jackets, and these are made into continuous rings or annuli before association with the cover. It is obvious that if a cover or tire of this description be made on an ordinary "former" the wires or bands being of less diameter than outside diameter of the "former" will prevent the removal of the cover from the "former" after its manufacture has been completed. For this reason, therefore, I employ some form of sectional or collapsible "former," which can be made sufficiently rigid to allow of the cover or tire being formed thereon, and which can be taken to pieces or in any way reduced or collapsed to permit of the removal of the cover without stretching or straining. The section of the "former" or that portion of the same which receives the cover is approximately the shape of the finished tire, and it is provided on each side with circumferential flanges or seats of very slightly less diameter than the endless bands.

In using this appliance the ends of a canvas strip which is to form the cover are joined to form an endless band that may be passed over the "former." The endless wires or inextensible bands are then passed over the edges of the canvas and around the circumferential flanges or seats of the "former" and forced up close to the main or arch-shaped body of the former. The edges of the canvas strip are then drawn tightly and cemented to that portion of the strip lying over the arch-shaped part of the "former" whereby the wires are perfectly associated with the cover, along parallel lines in the same, for, since the said wires seat themselves in the angle formed by the arch-shaped body of the "former" and the flanges or seats, the width of the finished cover must be at all points exactly equal to the distance from one wire to the other over the arch-shaped surface of the "former."

Various equivalents for the flanges or seats above described may be used, as I shall hereinafter explain.

In order that my invention may be more clearly understood I will now proceed to describe the same with reference to the accompanying drawings, in which—

Figure 1 is an elevation of one of my improved formers. Fig. 2 is a section on the line $xx$, Fig. 1, part being broken away. Figs. 3 to 8 are detail sectional views showing various modes of construction of my improved "formers." Fig. 9 is a side view of a "former" fitted with a collapsing arm.

Similar letters of reference denote similar parts in all the drawings.

In Figs. 1 and 2, A is the rim of the "former" which is made of any suitable material preferably wood, and constructed of a suitable number of segments hinged together at the joints $a$, $a$. The hinge pin $a'$ of one of the joints $a$ can be withdrawn when required allowing the "former" to be collapsed or folded up as shown in dotted lines so that the canvas jacket when finished can be taken off the "former." Any suitable catch or spring may be used to effect the temporary connection of one of the joints, but the loose hinge pin is a very neat and satisfactory device. The section of the "former" is shown in Fig. 2, where A is the rim of the "former" and B is the arched canvas cover having endless wires or cores $b$ secured in position in its edges. While the tire is being made on the "former" the said wires $b$ find a seating in the angles $a^2$, $a^2$, thus enabling the canvas to be drawn very tightly round the wires.

Instead of using a wooden "former" I sometimes make the rim of the same of metal which may be cast in hollow sections of a shape similar to the sections of the wooden "former" shown, but I prefer to make the sections of two metal plates $A'$, $A^2$, with their edges rolled or folded together as shown in Fig. 3 which is a sectional view of the rim. The two plates may obviously be joined in various ways.

In Fig. 4 A is a jointed collapsible wooden rim of the shape which the interior of the tire cover is to have when finished, and C is a pulley with a cylindrical rim which is wider than the wooden rim A. When the canvas portion of the tire cover is finished, the wooden rim may be slipped off the pulley and collapsed or folded together and the canvas very readily detached. The angles $a^2$ are formed at the junction of the pulley C and the wooden rim A. In place of a wooden rim, I sometimes use an inflated tube of suitable size with the pulley C as shown at A Fig. 5. The tube A is maintained flat at the side next the pulley by means of an endless band E placed in its interior the said band being of such a size as will cause the tube to press tightly against the pulley so as to form the angles at $a^2$ and also to keep the tube in a proper shape.

In another "former" the section of the rim of which is shown in Fig. 6, I provide grooves $a^3$ in which the wires are seated while the canvas cover is being made, and I sometimes provide different sets of grooves as shown at $a^4$ so that tires of different depths or diameters may be made on the same "former" or I deepen the grooves considerably and provide metal or wooden rims F which fit in the same and thus make the angles $a^2$ for the reception of the wires or cores in the edges of the cover as shown in Fig. 7. In the "formers" shown in Figs. 6 and 7 the wooden part is made collapsible and the hoops, bands, or rims F are detached from the grooves before folding the wooden part so as to release the cover.

In Fig. 8 I show another method of adapting a "former" to make tires of different depths or diameters. A is the wooden rim of a "former" like that shown in Fig. 1, and H are rings placed round the sides of the "former" so as to bring the angles $a^2$ nearer to the outermost part of the circumference. The depth or diameter of the finished tire is then diminished by an amount equal to the thickness of the rings H. The said rings are kept in position when in use by the buttons $h$ Figs. 1 and 8.

It is often a matter of difficulty if the canvas cover is well made to replace the same on a "former" when once it has been taken off the latter and I may therefore furnish any of the collapsing "formers" with an arm or lever G Fig. 9 which links those sections $A^3$ $A^4$ of the former which are only temporarily connected together. On pressing the arm or lever the "former" collapses as shown in dotted lines in Fig. 9.

The "former" preferably has an arm I which is pivoted near the center of the former on a stand and a treadle or other means is sometimes provided in order to admit of a rotary motion being given to the "former" while it is being used.

Wooden "formers" are apt to shrink after being used for some time and thus become too small for the size of the tires which are intended to be made on them. In order to obviate this difficulty I may provide that one of the sections shall be capable of being lengthened circumferentially as shown at $A^5$ Figs. 1 and 2. The said section is divided and one part thereof adjustably connected to the other part by a plate J which is rigidly secured to one part by the bolts $j$ but which is attached to the other part by bolts $j'$ passing through a slot $j^2$ in the said plate. It is obvious that by slacking the bolts $j'$ the parts can be adjusted till the "former" is of the correct circumference. When my improved former is made of metal the tire may be vulcanized before removal from the said former.

When securing the outer india-rubber portion of the tire cover to the inner canvas lining, I often use an inflated air tube for holding the lining in a circular shape. Such an inflated holder is very light and easily handled and it may be deformed from its circular shape so as to release the finished tire cover without trouble.

What I claim is—

1. A collapsible tool or "former" for use in manufacturing tires and tire covers said "former" having a circular rim shaped externally to the size and shape of the tire or tire cover to be made thereon and provided with circumferential flanges or seats to receive the cores in the edges of the tire or tire cover, for the purpose specified.

2. In a collapsible tool or "former" for manufacturing tires or tire covers, the combination of, a series of sections shaped externally to the size and shape of the tire or tire cover to be made thereon and provided with circumferential flanges or seats to receive the cores in the edges of the tire or tire cover, hinges connecting said sections, and means whereby the sections are locked together to form a circular rim and unlocked to allow the same to be deformed from its circular shape and the sections to be folded inward for the purpose specified.

3. In a tool or "former" for manufacturing tires, the combination with a collapsible rim, of rings mounted on the side flanges of the said rim, and buttons attached to said rim adapted to keep the said rings in place thereon, for the purpose specified.

4. In a tool or "former" for manufacturing tires, the combination with a collapsible rim constructed in sections hinged together, of an arm pivoted on two adjacent sections of the rim and adapted to deform the rim from its circular shape so as to release the tire cover when finished, substantially as set forth.

5. In a tool or "former" for manufacturing tires or tire covers, the combination with a cylindrical rim C of a collapsible ring A shaped externally to the size and shape of the interior of the tire or tire cover to be made thereon, for the purposes specified.

6. In a tool or "former" for manufacturing tires, the combination of a collapsible rim A shaped to fit the interior of the tire, and hoops F fitting in recesses provided in the said rim so as to form the angular grooves $a^2$, for the purpose specified.

In witness whereof I have hereunto set my hand this 23d day of December, 1892.

CHARLES KINGSTON WELCH.

Witnesses:
    FREDERICK BAXTER,
    REGINALD LEW MORGAN.